United States Patent
Berkey et al.

(10) Patent No.: US 7,158,705 B2
(45) Date of Patent: Jan. 2, 2007

(54) OPTICAL FIBER WITH BIREFRINGENCE AND LARGE MODE FIELD DIAMETER

(75) Inventors: George E Berkey, Pine City, NY (US); Xin Chen, Corning, NY (US); Ming-Jun Li, Horseheads, NY (US); Daniel A Nolan, Corning, NY (US); Ji Wang, Painted Post, NY (US); William A Wood, Painted Post, NY (US); Luis A Zenteno, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/930,889

(22) Filed: Aug. 30, 2004

(65) Prior Publication Data

US 2006/0045446 A1    Mar. 2, 2006

(51) Int. Cl.
*G02B 6/02* (2006.01)

(52) U.S. Cl. ...................................... 385/123

(58) Field of Classification Search ......... 385/123–128
See application file for complete search history.

(56) References Cited

U.S. PATENT DOCUMENTS

| 4,184,859 A | 1/1980 | Maklad ............................ 65/2 |
| 4,274,854 A | 6/1981 | Pleibel et al. ..................... 65/2 |
| 4,307,938 A | 12/1981 | Dyott ......................... 350/96.3 |
| 4,578,097 A * | 3/1986 | Berkey ......................... 65/403 |
| 4,906,068 A * | 3/1990 | Olson ........................... 385/43 |
| 6,229,946 B1 * | 5/2001 | Sasaoka et al. .............. 385/123 |
| 6,532,331 B1 * | 3/2003 | Kato et al. ................... 385/123 |
| 6,606,441 B1 * | 8/2003 | Irie et al. ..................... 385/127 |
| 6,788,865 B1 * | 9/2004 | Kawanishi et al. ......... 385/125 |
| 2003/0002834 A1 * | 1/2003 | Brown et al. ................ 385/123 |
| 2003/0215201 A1 * | 11/2003 | Tanigawa et al. ........... 385/123 |
| 2004/0052278 A1 * | 3/2004 | Kane et al. .................... 372/25 |
| 2004/0258341 A1 * | 12/2004 | Paolucci et al. ............... 385/4 |
| 2005/0158006 A1 * | 7/2005 | Koh et al. .................... 385/143 |
| 2005/0226580 A1 * | 10/2005 | Samson et al. ............. 385/127 |

FOREIGN PATENT DOCUMENTS

WO    WO2006/026653 A3    3/2006

\* cited by examiner

*Primary Examiner*—Sung Pak
*Assistant Examiner*—Tina Wong
(74) *Attorney, Agent, or Firm*—Svetlana Z. Short

(57) ABSTRACT

According to the present invention the optical fiber includes a core with a first refractive index ($n_1$) and the innermost core region with the refractive index $n_0$, a cladding surrounding the core, the cladding having a third refractive index ($n_3$), wherein $n_1 > n_3$ and $n_0 < n_1$. According to some of the embodiments the optical fiber may also include a moat surrounding and abutting the core and situated between the core and the cladding, the moat having a second refractive index ($n_2$), wherein $n_3 > n_2$. It is preferable that at least one of the core, innermost core region and/or moat has a non-circular shape.

26 Claims, 10 Drawing Sheets

Fig. 15
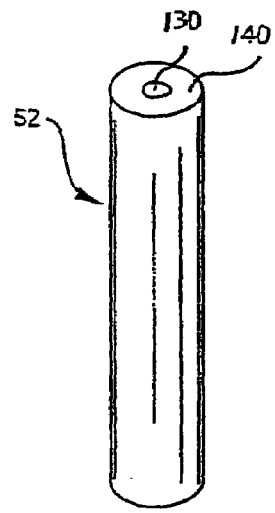
Fig. 16
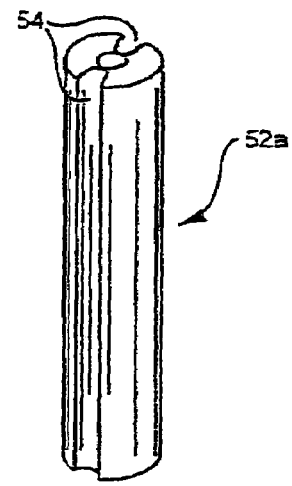
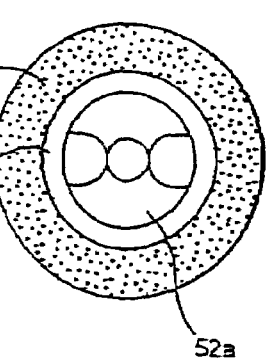
Fig. 17
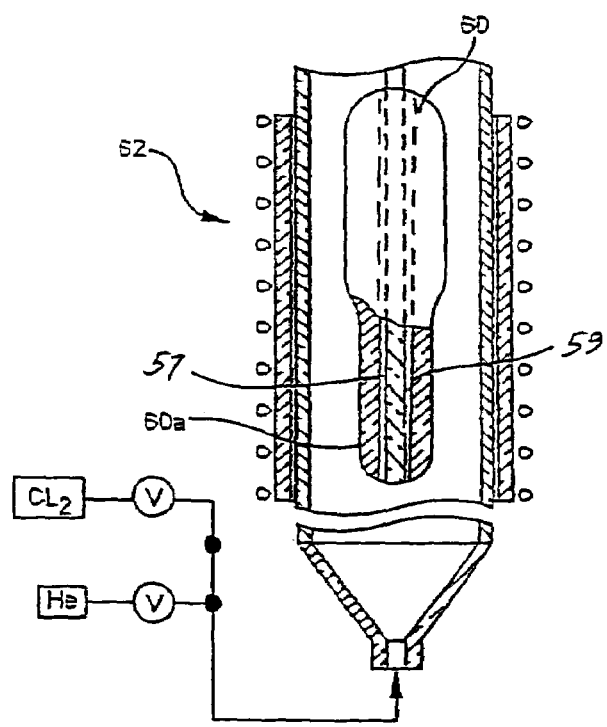
Fig. 18

OPTICAL FIBER WITH BIREFRINGENCE AND LARGE MODE FIELD DIAMETER

BACKGROUND OF THE INVENTION

1. Field of the Invention

The present invention relates generally to optical waveguide fibers, and more particularly to an optical fiber exhibiting polarization maintenance or single polarization properties.

2. Technical Background

Single polarization optical fibers are useful for ultra-high speed transmission systems or for use as a coupler fiber for use with, and connection to, optical components (lasers, EDFAs, optical instruments, interferometric sensors, gyroscopes, etc.). The polarization characteristic (single polarization) propagates one, and only one, of two orthogonally polarized polarizations within a single polarization band while suppressing the other polarization by dramatically increasing its transmission loss.

Polarization retaining fibers (sometimes referred to as a polarization maintaining fibers) can maintain the input polarizations on two generally-orthogonal axes. A common polarization maintaining fiber includes stress birefringence members and includes, as shown in FIG. 1, a central core 10 surrounded by an inner cladding region 11. Core 10 and cladding region 11 are formed of conventional materials employed in the formation of optical waveguides. The refractive index of the core material is greater than that of the cladding material. By way of example only, core 10 may consist of silica containing one or more dopants which increase the refractive index thereof, such as germania. Cladding region 11 may comprise pure silica, silica containing a lesser amount of dopant than core 10, or silica containing one or more down dopants, at least one of which is an oxide of an element such as boron or fluorine which lowers the refractive index of silica.

In FIG. 1, diametrically opposed relative to core 10, are two stress-inducing regions 12 formed of a glass material having a Thermal Coefficient of Expansion (TCE) different from that of cladding material 11. When such a fiber is drawn, the longitudinally-extending regions 12 and the cladding regions disposed orthogonally thereto will shrink different amounts whereby regions 12 will be put into a state of tension or compression strain. Strain induced birefringence (otherwise referred to a stress-induced birefringence) is imparted in the fiber and thereby reduces coupling between the two orthogonally polarized fundamental modes. Surrounding regions 12 is an outer cladding region 13, the refractive index of which is preferably equal to or less than that of inner cladding region 11. Region 13 may consist, for example, of any of the materials specified above for use as cladding region 11. It should be recognized that such fibers including these stress-inducing regions 12 do not provide single polarization properties.

Slight improvement in the polarization performance of single mode optical fibers has been achieved by elongating or distorting the fiber core geometry, as a means of decoupling the differently polarized waves. Examples of such optical fiber waveguides with elongated cores are disclosed in U.S. Pat. Nos. 4,184,859, 4,274,854 and 4,307,938. Prior Art FIG. 2 illustrates a waveguide 1 having a core 4 having refractive index, $n_1$, a cladding 5 having a refractive index, $n_2$, wherein the elongated core 4 has a major axis, a, and a minor axis, b. However, the noncircular geometry alone is, generally, not sufficient to provide the desired single polarization properties. It is also noted that this type of optical fiber has relatively low birefringence (i.e., $10^{-5}$ or less).

It has, therefore, been an area of ongoing development to obtain an optical fiber that will provide polarization maintenance or single polarization performance, and which is also easily manufacturable.

SUMMARY OF THE INVENTION

Definitions:

The following definitions and terminology are commonly used in the art.

Refractive index profile—the refractive index profile is the relationship between the refractive index ($\Delta\%$) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent $\Delta\%$—the term $\Delta\%$ represents a relative measure of refractive index defined by the equation:

$$\Delta\% = 100 \times (n_i^2 - n_c^2)/2n_i^2$$

where $\Delta\%$ is the maximum refractive index of the index profile segment denoted as i, and $n_c$, the reference refractive index, is taken to be the refractive index of the cladding layer. Every point in the segment has an associated relative index measured relative to the cladding.

In accordance with some embodiments of the present invention, an optical fiber is provided which exhibits polarization maintaining (retaining) properties. In accordance with some of the embodiments of the present invention, an optical fiber is provided which exhibits single polarization properties within a Single Polarization Band (SPB). The fibers parameters are preferably selected such that the SPB coincides with an operating wavelength band.

According to the present invention the optical fiber includes a core with a first refractive index ($n_1$) and the innermost core region with the refractive index $n_0$, a cladding surrounding the core, the cladding having a third refractive index ($n_3$), wherein $n_1 > n_3$ and $n_0 < n_1$. The optical fiber exhibits polarization maintenance in at least one of X—X or Y—Y axis According to some of the embodiments the optical fiber may also include a moat surrounding and abutting the core and situated between the core and the cladding, the moat having a second refractive index ($n_2$), wherein $n_3 > n_2$. It is preferable that at least one of the core, innermost core region and/or moat has a non-circular shape.

According to one embodiment of the present invention the optical fiber comprises:

(i) a core including a first refractive index ($n_1$), the core having a first dimension (a1) and a second dimension (a2), such that (a1) is along the X—X axis and (a2) is along Y—Y axis, wherein the axis X—X is orthogonal with the axis Y—Y; the core including a centermost inner core region with the refractive index $n_0$, wherein $n_0 < n_1$, the inner core region having outer dimensions (b1) and (b2) which are measured orthogonally to one another;

(ii) a moat surrounding and abutting the core, the moat having a second refractive index ($n_2$) and, an outer dimension (c1) along an axis X—X aligned with the second dimension (a1), and an outer dimension (c2) along an axis Y—Y aligned with the first dimension (a2); and (iii) a cladding surrounding the moat, the cladding having a third refractive index ($n_3$), wherein at least one of the core, inner core region or moat is laterally elongated such that the ratio of at least one of a2/a1; b2/b1, c2/c1 is not 1:1, $n_1 > n_3 > n_2$, a ratio of a2/a1 is between 1 and 3.0, a ratio of c1/a1 is between 1.0 and 4.0, and the optical fiber exhibits polarization maintenance in at least one of X—X or Y—Y axis. The inner core region can be, for example, an air hole or a down-doped rod extending along the longitudinal length of the fiber core.

According to some embodiments optical fiber structure produces performance preferably exhibiting a SPB width of at least 5 nm; more preferably greater than 10 nm and even more preferably greater than 50 nm. In some of the embodiments of the optical fibers according to the present invention the SPB width is 70 to 240 nm.

More particularly it is believed that in these embodiments the effective refractive index of one of the polarizations is such that this polarization cannot propagate within the SPB, while the other orthogonal polarization associated with different effective refractive index is such that this polarization may still propagate in the SPB. Accordingly, single polarization propagation within the SPB is provided by the fiber with a relative simple structure.

The core preferably contains germania-doped silica, and the moat contains fluorine-or boron-doped silica. The inner core region is either an air hole or a down-doped glass, for example fluorine-or boron-doped silica. The preferred relative refractive index ($\Delta 1$ of the inner core region is more negative than −0.15%; preferably more negative than −0.5%. Preferred maximum relative refractive index ($\Delta 2$) for the core is greater than 0.2%; more preferably between 0.5% and 2.5%. Similarly, the preferred relative refractive index ($\Delta 3$) of the moat is more negative than −0.15%; more preferably between −0.15% and −0.8. Additional features and advantages of the invention will be set forth in the detail description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

FIGS. 15–17 and 20 are diagrams illustrating various states and subcomponents of the optical fiber perform utilized to manufacture the highly birefingent optical fiber in accordance with the present invention.

FIGS. 18–19 and 21 are diagrams illustrating various apparatus utilized in the manufacture of the highly birefingent optical fiber in accordance with the present invention.

DETAILED DESCRIPTION OF THE PREFERRED EMBODIMENTS

For purposes of the description herein, it is to be understood that the invention may assume various alternative configurations, except where expressly specified to the contrary. It is also to be understood that the specific fibers illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise. As used herein, all optical measurements given herein are in the fundamental polarization mode, unless otherwise specified.

Figure 1:
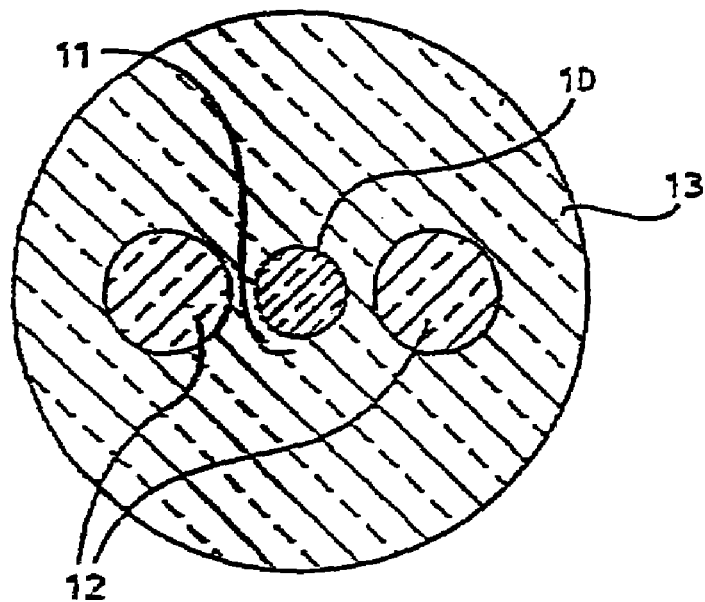
FIG. 1 is a cross-sectional view of an optical waveguide of the prior art including stress-inducing regions.
Figure 2:
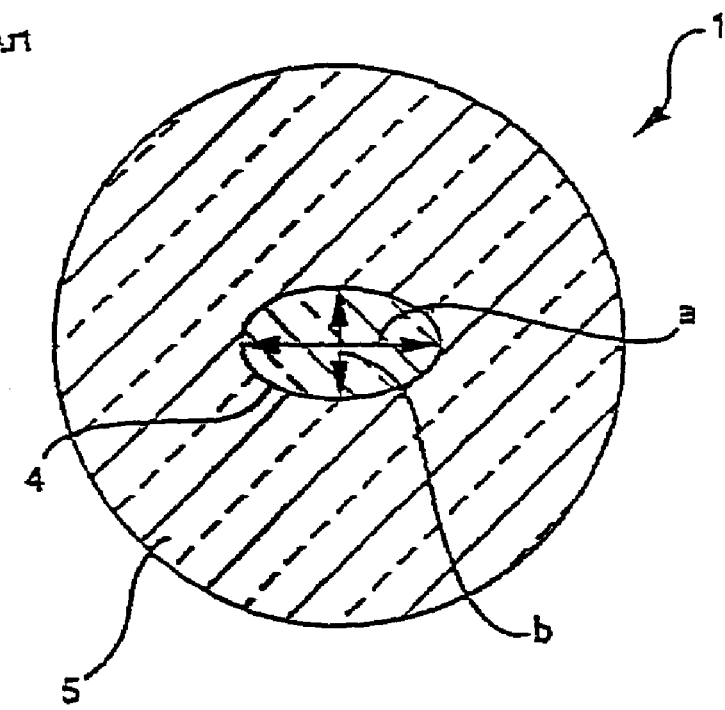
FIG. 2 is a cross-sectional view of another optical waveguide of the prior art.
Figure 3A:
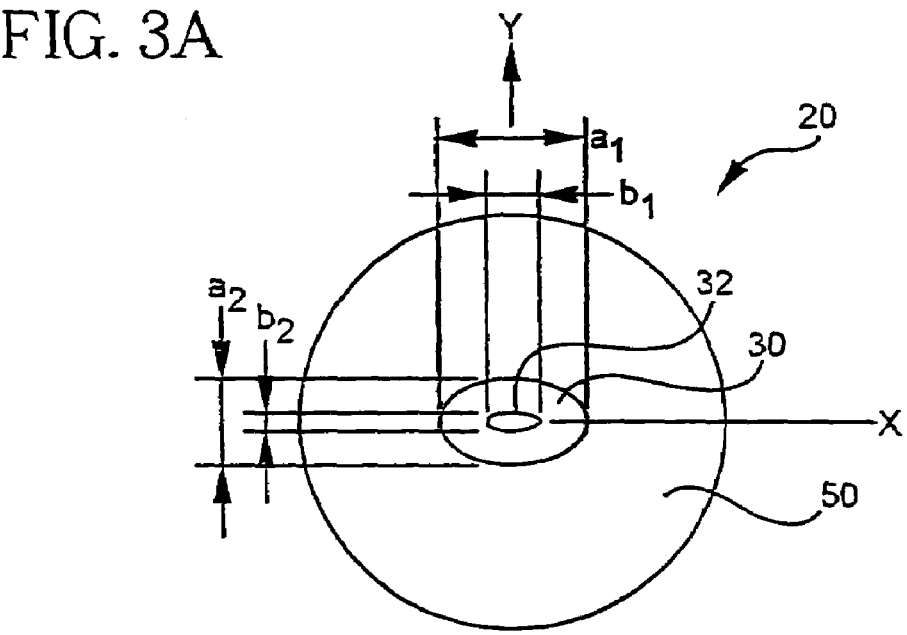
FIG. 3A is a cross-sectional view of one embodiment of the optical fiber in accordance with the present invention.
Figure 3B:
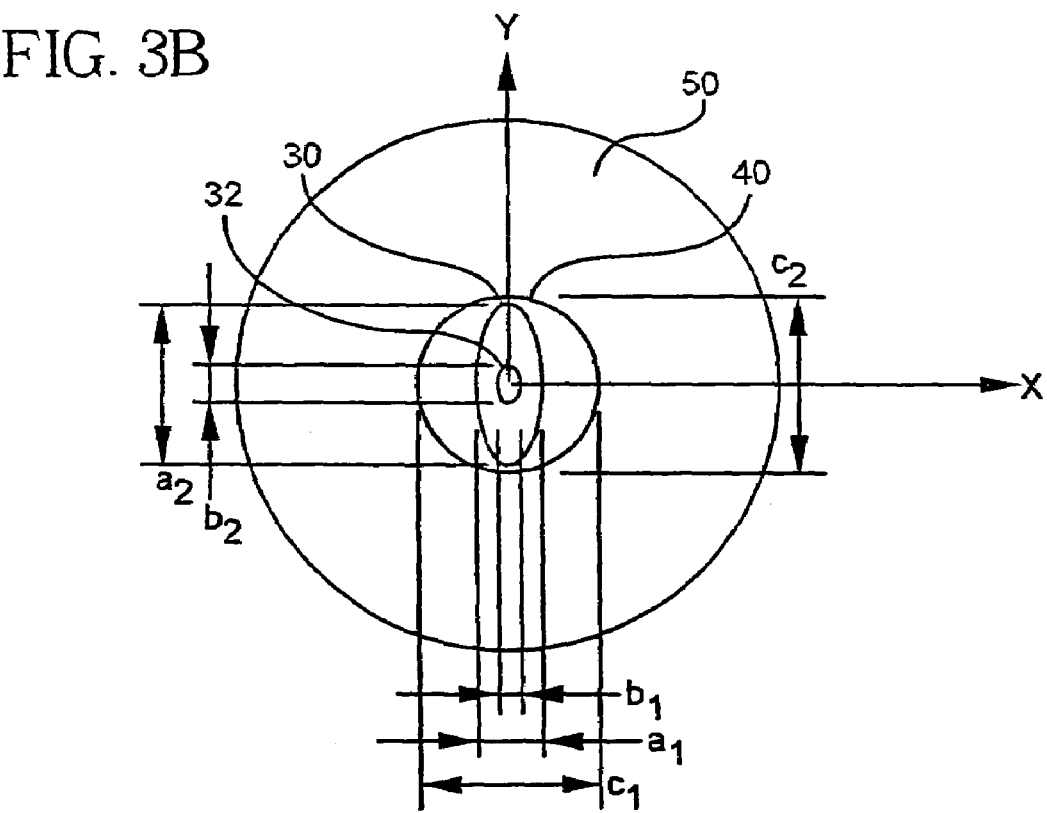
FIG. 3B is a cross-sectional view of another embodiment of the optical fiber in accordance with the present invention.

According to the embodiments of the present invention the optical fiber 20 (See FIGS. 3A, 3B) has a core 30 with a first refractive index ($n_1$) and outer dimensions a1, a2, the core including an innermost core region 32 with the refractive index $n_0$ and outer dimensions b1, b2, and a cladding 50 surrounding the core 30, the cladding 50 having a third refractive index ($n_3$), wherein $n_1 > n_3$ and $n_0 < n_1$. In some of the embodiments the optical fiber 20 further includes a moat 40 surrounding and abutting the core 30 and situated between the core 30 and the cladding 50, the moat 40 having a second refractive index ($n_2$) and outer dimensions c1, c2, wherein $n_3 > n_2$. The cladding 50 preferably has an outer diameter of between about 70 and 140 microns; more preferably about 80 to 125 microns; but may, in some embodiments, have a cladding outer diameter greater than 150 microns, for example. The fiber 20 is then preferably covered with a conventional two-modulus coating (not shown for clarity) to an outside dimension of about 250 microns.

If the moat 40 is not present, the optical fiber will typically function as a polarization maintaining (PM) fiber. If the optical fiber includes the moat, the optical fiber will function as a single polarization (SP) fiber. It is preferable that at least one of the core 30, innermost core region 32 and/or moat 40 has a non circular shape (for example, an elongated shape).

Figure 3C:
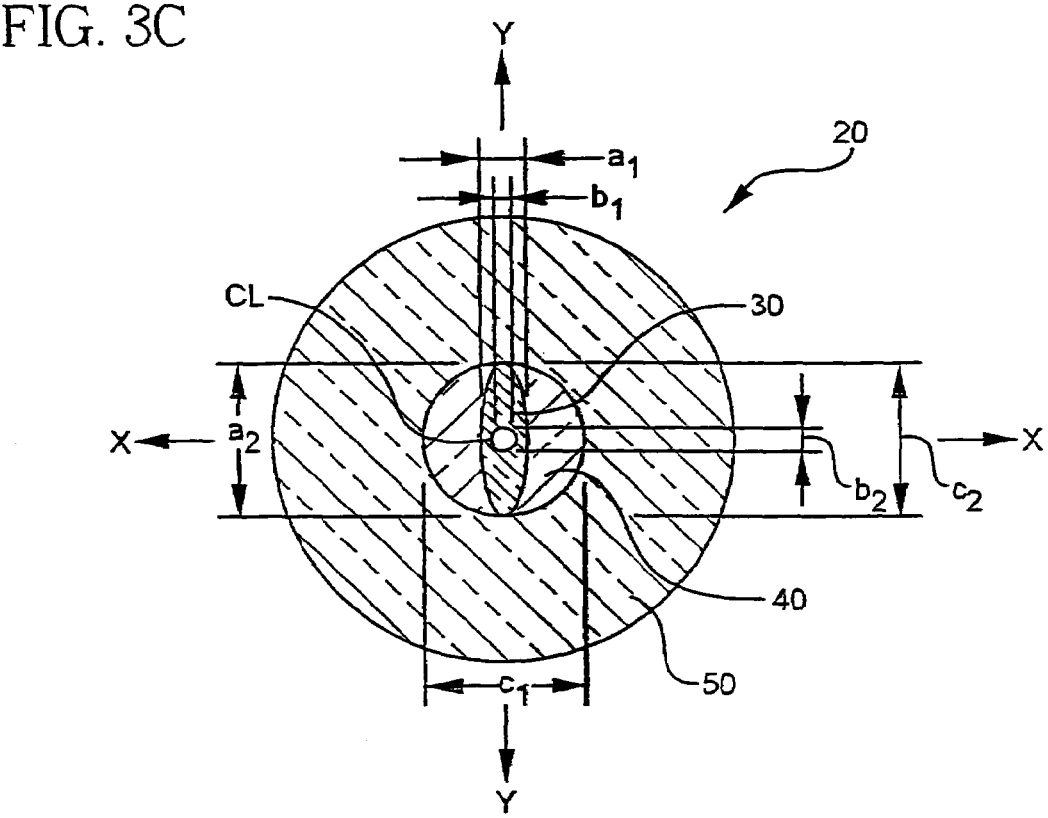
FIG. 3C is a cross-sectional view of yet another embodiment of the optical fiber in accordance with the present invention.

According to some of the embodiment of the present invention, as illustrated in FIG. 3C, the optical fiber 20 includes:

a core 30 including a first refractive index ($n_1$), the core having a first dimension (a1) and a second dimension (a2) such that (a1) is along the X—X axis and (a2) is along Y—Y axis, wherein the axis X—X is generally orthogonal with the axis Y—Y, the core 30 including a centermost inner core region 32 with the refractive index $n_0$, wherein $n_0 < n_1$, and the inner core region 32 having outer dimensions (b1) and (b2), such that (b1) and (b2) are orthogonal to one another;

a cladding 50 surrounding the core 30, the cladding 50 having a third refractive index ($n_3$), wherein at least one of the core 30 or inner core region 32 is elongated such that the ratio of at least one of a2/a1; b2/b1, is not 1:1, $n_1 > n_3$, a ratio of a2/a1 is between 1 and 3.0; and the optical fiber exhibits polarization maintenance in at least one of X—X or Y—Y axis. The inner core region 32 can be, for example, an air hole or a down-doped silica rod extending along the longitudinal length of the fiber core. The polarization maintaining optical fiber 20 exhibits high polarization maintaining performance. The birefringence of the optical fiber 20 is least $5 \times 10^{-5}$, preferably $1 \times 10^{-4}$ and most preferably $5 \times 10^{-4}$.

Four examples of optical fiber 20 are provided in Table 1. In these table, $\Delta_1$ (%) is relative refractive index percent of the inner core region 32 and $\Delta_2$ (%) is relative refractive index percent of the core 30

TABLE 1

|  | Example 1 | Example 2 | Example 3 | Example 4 |
|---|---|---|---|---|
| $a_1$ (μm) | 0.25 | 0.5 | 0.5 | 1.65 |
| $b_1$ (μm) | 0.075 | 0.15 | 0.1 | 0.55 |
| $a_2$ (μm) | 2.5 | 2.5 | 1.5 | 2.84 |
| $b_2$ (μm) | 1.5 | 2.5 | 0.9 | 1.7 |
| $\Delta_1$ (%) | −54 | −54 | −54 | −1 |
| $\Delta_2$ (%) | 1 | 1 | 2 | 1 |
| Birefringence* | $4.1 \times 10^{-4}$ | $3.6 \times 10^{-4}$ | $9.3 \times 10^{-4}$ | $7.6 \times 10^{-5}$ |

Birefringence is measured at λ = 1300 nm

More specifically, Table 1 provides parameters for the four examples of the optical fiber 20 according to the present invention. The exemplary optical fibers 20 of Table 1 do not include a moat and are polarization maintaining fibers. The optical fibers of examples 1–3 include an elongated air-filled hole 25 as their inner core region 32. The optical fiber of example 4 has an elongated inner core region 32 which is down-doped silica. That is, the index of refraction of the inner core region 32 of the optical fiber of example 4 is lower than that of pure silica. The inner core region 32 preferably exhibits a relative refractive index %, Δ1, which is negative (less than cladding 50); preferably more negative than about −0.15; more preferably more negative than −0.3%, and even more preferably between −0.5% and −35%.

The inner core regions 32 of the four exemplary optical fibers of Table 1 are characterized by dimensions b1, b2. The optical fiber 20 of examples 1, 3 and 4 have core 30 with an elliptical cross-section, characterized by dimensions a1, a2, while the cross-section of the core 30 of the optical fiber 20 of example 4 is circular (i.e., a1=a2). Optical fibers of examples 1, 2 and 4 have a relative core refractive index percent $\Delta_2$ (%) of 1, while in example 3 the relative core refractive index percent $\Delta_2$ (%) of the optical fiber is 2. Table 1 illustrates that (see examples 1–3, optical fibers with the air filled inner core region 32) the birefringence increases with the increase in relative core refractive index $\Delta_2$ (%). The optical fibers with the same relative core refractive index and the air filled inner core regions exhibit larger birefringence than optical fibers with the down doped glass inner core region. Table 1 shows that various parameters can be adjusted to achieve the desired fiber birefringence.

According to some of the embodiments of the present invention, as illustrated in FIG. 3C-5, the optical fiber 20 includes:

a core 30 including a first refractive index ($n_1$), the core having a first dimension (a1) and a second dimension (a2) such that (a1) is along the X—X axis and (a2) is along Y—Y axis, wherein the axis X—X is generally orthogonal with the axis Y—Y, the core 30 including a inner core region 32 with the refractive index $n_0$, wherein $n_0 < n_1$, the inner core region 32 having outer dimensions (b1) and (b2), such that (b1) and (b2) are orthogonal to one another;

a moat 40 surrounding and abutting the core 30, the moat 40 having a second refractive index ($n_2$) and, an outer dimension (c1) along an axis X—X aligned with the second dimension (a2), and an outer dimension (c2) along an axis Y—Y aligned with the first dimension (a1); and a cladding 50 surrounding the moat 40, the cladding 50 having a third refractive index ($n_3$), wherein at least one of the core 30, inner core region 32 or moat 40 is elongated such that the ratio of at least one of a2/a1; b2/b1, c2/c1 is not 1:1, $n_1 > n_3 > n_2$, a ratio of a2/a1 is between 1 and 3.0, a ratio of c1/a1 is between 1.0 and 4.0, and the optical fiber exhibits polarization maintenance in at least one of X—X or Y—Y axis. The inner core region 32 can be, for example, an air hole or a down-doped silica rod extending along the longitudinal length of the fiber core.

It is noted that the dimensions b1, b2 of the inner core region 32 may be along the X—X and Y—Y axis, respectively. Therefore, the dimensions b1, b2, may be aligned with a1, c1 and a2, c2 dimensions, respectively.

Figure 8:
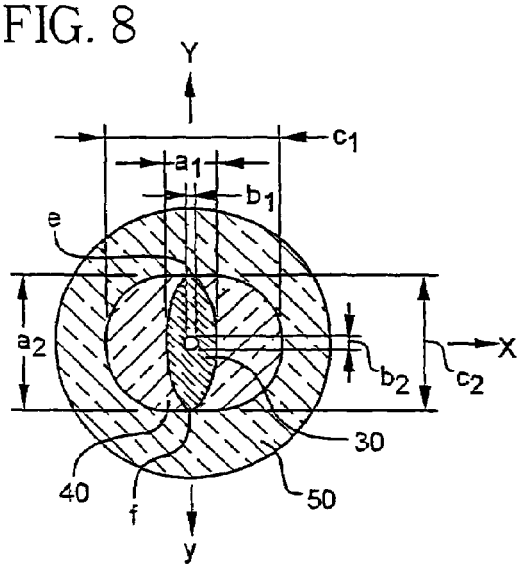
FIGS. 8–9 are cross-sectional views of additional embodiments of optical fibers in accordance with the present invention.
Figure 9:
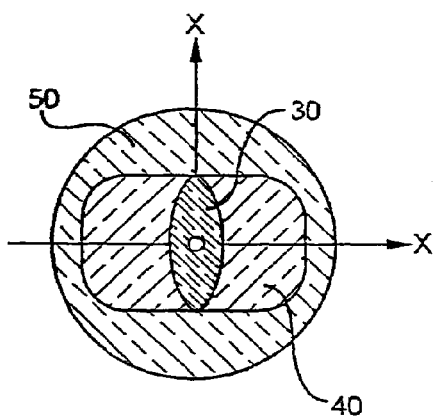

Some of the exemplary embodiments of the optical waveguide fiber 20 in accordance with the invention described and disclosed herein has a general cross-sectional structure, as best shown in FIGS. 3C-5, 7 and 10. In the illustrated embodiment, the optical waveguide fiber 20 includes a core 30 that extends along the longitudinal axis of the fiber 20. The core includes a centermost inner core region 32 which has an index of refraction lower than that of the core 30. In the embodiments of FIGS. 3C, 8 and 9, the innermost core region 32 has a circular cross-section. In these embodiments the inner core region 32 is an air hole 25 extending inside and along the length of the fiber core 30.

This elongated core 30 of this example has a long or maximum dimension, a2, and a short or minimum dimension, a1, measured orthogonally across the fiber relative to the fiber's longitudinal axis; the a1 and a2 dimensions being measured generally orthogonal to each other. The cross-sectional shape of the core 30 of this embodiment is best described as elongated. The term "elongated" includes core shapes such as: generally oblong, oval, elliptical, diamond-shaped, or the like. Such core elongation is believed to provide at least some level of form (or geometrical) birefringence to the fiber 20. Preferably, the extent of elongation is controlled during fiber processing (e.g., redraw) such that the elongated core 30 of the drawn optical fiber 20 exhibits the desired aspect ratio, AR, defined herein as a2/a1. Preferably, if the fiber core 30 is elongated, the AR of the core 30 is greater than 1.5; more preferably between 1.5 and 5.0; more preferably in the 1.8 to 3.5 range; and in a large percentage of the embodiments, in the 1.9 to 3.0 range. However, a core 30 that has a circular cross section may be used with an elongated (for example, elliptical) inner core region 32 to achieve the desired birefringence. The dimensions b1 and b2 of the inner core region 32 are also measured orthogonally across the fiber relative to the fiber's longitudinal axis and are orthogonal to each other. If the inner core region 32 has a non-circular cross-section, then $b2/b1 \neq 1$. If the inner core region 32 has an elongated cross-section, it is preferable that the ratio b2/b1 (or b1/b2) be between 1.5 and 6, more preferably between 2 and 3. In this exemplary embodiment the inner core region 32 (corresponding to the air hole 25) has a circular cross-section, thus b1=b2. Furthermore, the inner core region 32 does not have to be an air hole, but may be made of down doped silica, for example fluorine and/or boron-doped silica, such that $n_0 < n_1$.

The core 30 of this exemplary embodiment extends radially from the inner core region 32 (in this example, an air hole) outward from the centerline, CL, of the fiber 20 and is made of up-doped silica having, preferably a step index profile shape, as shown. Optionally, the core 30 of the fiber 20 may include a graded index shape, as illustrated by dotted line 31 in FIGS. 4–5, 7 and 10.

Figure 4:
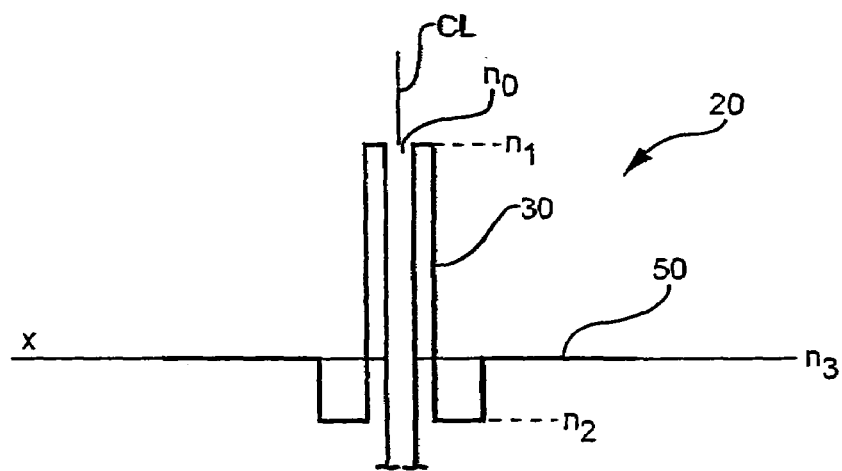
FIG. 4 is a diagram of the refractive index profile of the first embodiment taken along the axis Y—Y of FIG. 3C.
Figure 5:
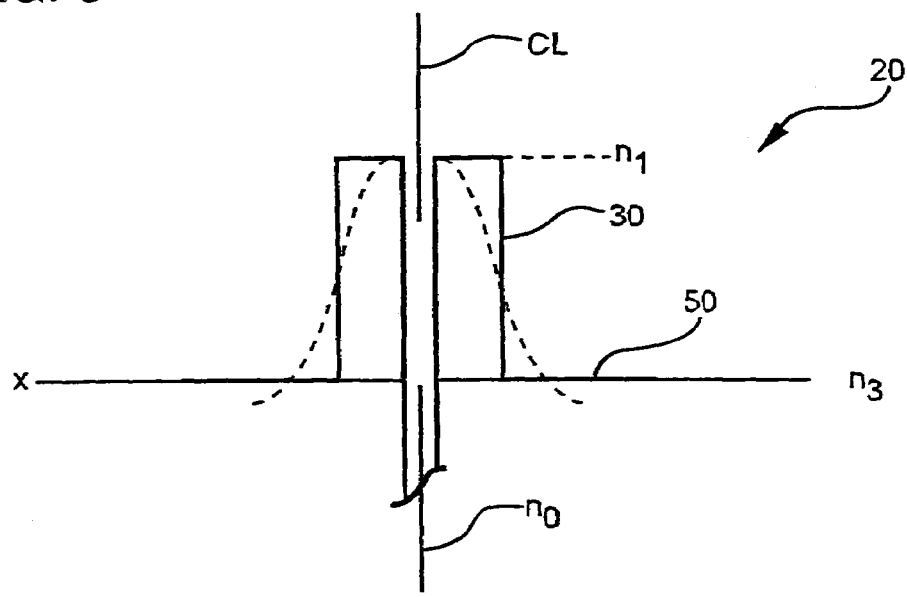
FIG. 5 is a diagram of the refractive index profile of the optical fiber of FIG. 3C taken along the axis X—X.

The core 30 is preferably manufactured from germania-doped silica, wherein germania is provided in a sufficient amount such that the core exhibits a first refractive index, $n_1$, above the refractive index, $n_3$, of the fiber's cladding 50 as best shown in FIGS. 4 and 5. Preferably, germania is added in an amount sufficient to provide the core 30 with a maximum relative refractive index %, $\Delta 1$ (FIGS. 7, 10), of greater than 0.2%; more preferably greater than 1.0%; and most preferably between about 0.2% and 2.5%; and most preferably between about 0.5% and 2.5%. In this example the core is elongated and the lateral dimensions, a1, and, a2, of the elongated core 30 are preferably designed to be in the range between 1.0 to 6.0 microns (more preferably 1.0 to 4.0 microns), and 3.0 to 10.0 microns (more preferably 3.0 to 8.0 microns), respectively. Furthermore, the average diameter of the core 30 ($D_{Core-avg} = \{a1+a2\}/2$) is preferably between about 2.0 and 8.0 microns; more preferably between 2.0 and 6.0 microns. The average dimensions ($D_{in-avg} = \{b1+b2\}/2$) of the inner core region 32 are preferably between 0.01 and 2 microns, more preferably between 0.15 and 1 microns. The inner core region 32 has a negative relative refractive index $n_0$ (i.e., the refractive index that is lower than that of pure silica).

The optical fiber 20 according to the present invention preferably exhibits polarization maintenance along at least one axis (e.g., at least one X—X or Y—Y axis). If the fiber exhibits polarization maintenance in both X—X or Y—Y axis, the fiber is a polarization maintaining fiber. If the optical fiber exhibits polarization maintenance along one of the axis only, and extinguishes the polarization propagating along another, orthogonal axis, than this fiber is a single polarization SP fiber.

Seven examples of optical fibers 20 exhibiting single polarization (SP) are provided in Table 2. Each of these exemplary fibers includes a moat 40 situated between the core 30 and the cladding 50. In Table 2, $\Delta_1$ (%) is relative refractive index percent of the inner core region 32 and $\Delta_2$ (%) is relative refractive index percent of the core 30, and $\Delta_3$ (%) is relative refractive index percent of the moat 40. If the inner core region 32 is the air filled hole 25, the larger dimension of the hole is less than 1. Preferably, the hole 25 should be made smaller for small delta $\Delta_1$ (%) fiber and larger for large delta $\Delta_1$ (%) fiber.

TABLE 2

|  | Example 1 | Example 2 | Example 3 | Example 4 | Example 5 | Example 6 | Example 7 |
|---|---|---|---|---|---|---|---|
| $a_1$ (μm) | 0.25 | 0.25 | 0.25 | 0.25 | 0.5 | 0.5 | 1.65 |
| $b_1$ (μm) | 0.075 | 0.075 | 0.075 | 0.075 | 0.15 | 0.1 | 0.55 |
| $a_2$ (μm) | 1.917 | 2.5 | 2.5 | 2.5 | 2.5 | 1.5 | 2.84 |
| $b_2$ (μm) | 1.15 | 1.5 | 1.5 | 1.5 | 2.5 | 0.9 | 1.7 |
| $a_3$ (μm) | 7.5 | 7.5 | 7.5 | 7.5 | 5 | 3.0 | 3.0 |
| $b_3$ (μm) | 4.5 | 4.5 | 4.5 | 4.5 | 5 | 1.8 | 4.25 |
| $\Delta_1$ (%) | −54 | −54 | −54 | −54 | −54 | −54 | −1 |
| $\Delta_2$ (%) | 1 | 1 | 1 | 1 | 1 | 2 | 1 |
| $\Delta_3$ (%) | −0.466 | −0.800 | −0.466 | −0.376 | −0.789 | −0.208 | −0.500 |
| Cutoff 1 (nm) | 1073 | 1355 | 1520 | 1592 | 1605 | 1615 | 1565 |
| Cutoff 2 (nm) | 1015 | 1256 | 1430 | 1510 | 1524 | 1375 | 1528 |
| Bandwidth (nm) | 58 | 99 | 90 | 82 | 81 | 240 | 37 |

It is noted that the center wavelength of each SP band is defined as the average of the two cutoff wavelengths (i.e., λ center=(λ Cutoff 1+λ Cutoff 2)/2).

The optical fibers of Table 2 are similar to the optical fibers of Table 1, except, as stated above, the optical fibers 20 of Table 2 also include moat 40 and are capable of single polarization SP operation. The optical fibers corresponding to examples 1–6 include an air filled inner core region 32. The optical fiber of example 7 has an inner core region made of down doped silica. Examples 1–4 have single polarization bands (SPBs) that are centered at 1060 nm, 1300 nm, 1450 nm and 1550 nm, respectively. These examples also demonstrate that the desirable SPB can be achieved by changing core dimensions and the level of doping in the moat. The SP optical fibers 20 achieve SPBs of about 30 nm to about 250 nm.

The fiber 20 according to these examples of the present invention preferably exhibits single polarization properties, that is, it has a polarization extinction wavelength difference between the cut off (extinction) wavelengths, $\lambda_1$, $\lambda_2$, of the two orthogonal fundamental polarization modes of light propagation. In particular, such fibers 20 according to some of the embodiments of the present invention preferably have a Single Polarization Band (SPB) 60 of at least 10 nm in width; more preferably greater than 20 nm in width; more preferably yet greater than 25 nm in width; and even more preferably greater than 50 nm. For example, some of the embodiments of the optical fiber 20 that utilize an air filled inner core region according to the present invention the SPB width is about 70 to 250 nm, while those with down doped silica inner core region have SPB width of about 25 to 40 nm.

Figure 6:
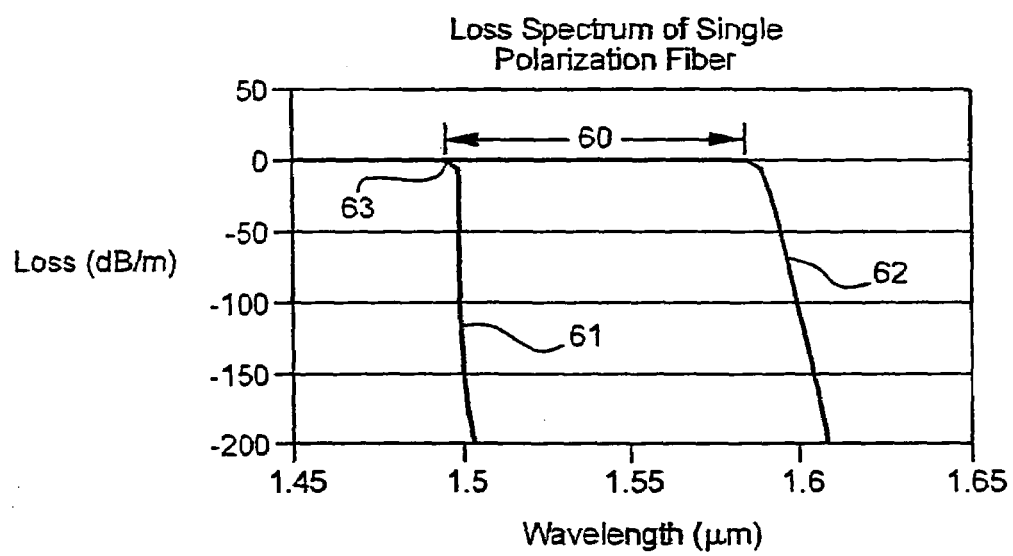
FIG. 6 is a simulation plot illustrating the cutoff wavelength for each polarization and the single polarization band for a representative embodiment of optical fiber in accordance with the present invention.

The SPB 60, as defined herein, is measured between the two polarization cut-off (extinction) wavelengths, $\lambda_1$ and $\lambda_2$, which are defined as the wavelengths at which the effective indices are equal to the refractive index of the cladding. FIG. 6 depicts a calculated loss spectrum of the two polarization modes and the first polarization 61 and the second polarization 62.

More precisely, the SPB 60 is the wavelength band located between the cut-off (extinction) wavelength 61 of the first polarization and the (extinction) wavelength 62 of the second polarization. (I.e., the SPB 60 is the distance (nm) between the first polarization cut-off wavelength $\lambda_1$ and the second polarization cut-off wavelength $\lambda_2$.) Point 63 is a departure point at which the first polarization wavelengths $\lambda_1$ splits off (or departs) from the second polarization wavelength $\lambda_2$. Within this SPB 60, true single polarization exists, that is, there is one, and only one, polarization which is provided and which propagates appreciably. For example, as can be seen from FIG. 6, only the second polarization 62 still propagates light appreciably within the SPB 60, whereas the first polarization 61 is significantly attenuated. This feature has excellent utility for use in devices or systems where one and only one propagating polarization is desired.

In the exemplary embodiment shown in FIG. 6, the SPB 60 extends between the wavelengths of about 1500 nm and 1600 nm (also, see example 4, Table 2), thereby providing a SPB of about 100 nm in width. However, it should be recognized that this range is exemplary and that other SPB widths may be designed and provided. For example, the width of the SPB 60 may be increased by increasing the core delta, $\Delta 2$. Likewise, making the core 30 more elongated, for example by making the a2/a1 ratio larger, will lead to a larger SPB width. Similarly, by lowering the index of refraction of the moat 40, the SPB 60 can be shifted to shorter wavelengths. Conversely, increasing the index of refraction of the moat 40 shifts the SPB 60 to higher wavelengths. Similarly, having a smaller sized moat shifts the SPB 60 to higher wavelengths. Moreover, making the $D_{core\ avg}$ dimension smaller will shift the SPB 60 to the shorter wavelengths. Thus, it should be recognized that the SPB may be appropriately adjusted in width and/or location to fit the needs of any particular application. More particularly, the SPB 60 is preferably designed such that it coincides with the operating wavelength band, $\lambda opb$. More preferably, the center wavelength of the SPB 60 substantially coincides with the center wavelength of the operating wavelength band, $\lambda opb$. The operating wavelength band, $\lambda opb$, may be located between 800–2000 nm, 950–1250 nm, or 1450–1650 nm, for example.

In the SP fibers, the fiber core 30 is preferably generally surrounded and abutted by a moat 40 having a different composition than the core 30 and preferably having an second refractive index, $n_2$, less than the first refractive of the core 30, and less than that of the cladding 40 (i.e., $n_2<n_1$ and $n_2<n_3$) As used herein, the term "moat" means a region having lower relative refractive index, as compared to the core 30, and which generally surrounds and preferably abuts the core. Most preferably, the moat 40 is down-doped relative to pure silica, and has, therefore, a negative relative refractive index (as compared to cladding). Most preferably, the moat 40 is manufactured from fluorine- or boron-doped silica, or combinations thereof. Furthermore, the moat 40 may include any combination of F, B and P as well.

Figure 7:
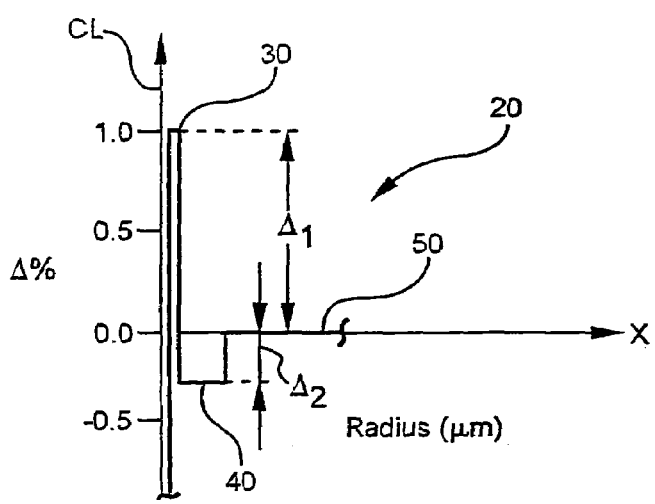
FIG. 7 is a diagram of relative refractive index versus radius of the optical fiber of FIG. 3C taken along the axis Y—Y axis.

Moat 40 preferably exhibits a relative refractive index %, $\Delta 3$, as best shown in FIG. 7, which is negative (less than cladding 50); preferably more negative than about $-0.15\%$; more preferably between about $-0.15\%$ and $-1.0\%$; and most preferably between $-0.3\%$ and $-0.8\%$. Generally, the glass in the moat 40 is doped such that it is appreciably less viscous at the desired draw temperature than is the center-most elongated core 30 or the cladding 50. The moat 40 may be either circular in shape as illustrated by FIG. 3C or elongated, such that its dimensions c1 and c2 may differ (for example, outer dimension, c1, may be slightly smaller than the outer dimension, c2, see FIG. 11). In this embodiment, the radially transverse dimensions, c1, and, c2, are such that the ratio of c2/c1 is between about 0.7 and 0.95. If the core 30 is non-circular, but laterally-extending, it is preferably substantially centered within the moat 40. In some embodiments, the outside portion of the moat 40 is configured to be substantially tangent to the core 30 at the maximum or long dimension location, a2, of the elongated core 30 (as shown in FIGS. 3C, 8, and 9). In other words, for these tangent embodiments, the c2/a2 ratio is approximately equal to 1.0.

The inventors herein discovered that the proper combination of sizes and shapes (ratios) of the core 30 and moat 40 provide the fiber's excellent single polarization properties. In particular, the combination of a1/a2 and c1/a1 ratios are believed to be important to optimize single polarization capability. In operation, because of the geometry and materials used in the core 30 and moat 40 it is believed that the effective refractive indices associated with each orthogonal polarization state are substantially different within the SPB. In particular, it should be recognized that the effective refractive index within the SPB 60 of the one polarization state is such that propagation with occur within the SPB, while the other polarization mode is very lossy because its effective refractive index so close to cladding (preferably equal to or less than cladding) that it does not effectively propagate (is cut off) within that range of wavelengths of the SPB, i.e., it is not a waveguide.

Alternatively, as best shown in FIGS. 8–9, the moat 40 may be configured to have other generally-elongated shapes, such as oval or elliptical, or rounded rectangular shape, etc. In these embodiments, the minimum dimension, c2, of the moat 40, measured along axis (Y—Y) and aligned with the dimension, a2, may be preferably substantially equal to the maximum dimension, a2, of the core 30 (i.e., a2/c2=1.0). The dimension, c2, is preferably aligned along the same axis with the maximum dimension, a2, of the core 30 (along Y—Y) such that the core and moat 40 become tangent at points e and f (See FIG. 8).

It is also important to recognize that in all embodiments described herein, the ratio of the dimension, c1, of the moat 40 to the minimum dimension, a1, of the elongated core 30 (c1 and a1 are measured along axis (X—X) and aligned with respect to one another), namely the ratio c1/a1, is preferably in the range of between 2.0 to 7.0; more preferably 2.5 to 5.0; and in a large number of the embodiments, 2.5 to 4.0. Again, maintaining this c1/a1 ratio was discovered to be one important factor in providing good single polarization properties along with maintaining the desired a2/a1 ratio described above.

Surrounding, and in contact with the moat 40 is the fiber cladding 50. The cladding 50 is preferably manufactured from pure silica and exhibits a third refractive index, $n_3$. The materials of the core 30, moat 40 and cladding 30 are selected and configured such that $n_1 > n_3 > n_2$. The cladding 50 preferably has an outer diameter of between about 80 and 140 microns; more preferably about 125 microns; but may, in some embodiments, have a cladding outer diameter greater than 150 microns, for example. The fiber 20 is then preferably covered with a conventional two-modulus coating (not shown for clarity) to an outside dimension of about 250 microns.

Figure 10:
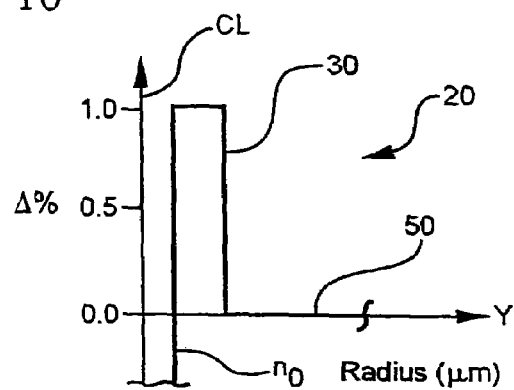
FIG. 10 is a diagram of relative refractive index versus radius of the optical fiber of FIG. 3B taken along the axis X—X.

General representations of the relative refractive index profiles of the single polarization fiber 20 are illustrated in FIGS. 7 and 10 along the Y—Y and X—X axes, respectively. The plots show relative refractive index percent (Δ%) charted versus the fiber radius (in microns) and distinctly illustrate the differences in the profiles along both such axes. In particular, the plots illustrate the maximum relative refractive index of the core 30, Δ2, and the minimum relative refractive index of the moat 40, Δ3, both measured relative to the cladding 50. Thus, it should be readily recognized that the refractive index profiles along each axis are very different thereby attributing to the excellent single polarization properties exhibited by the fiber 20.

In order to create polarization maintaining fiber, the fiber needs to have a large ($5 \times 10^{-5}$ and preferably $1 \times 10^{-4}$ or larger) amount of birefringence due to geometry or stress asymmetry. For example, it is preferable that at least the core, the moat or the inner core region be non-circular. In addition, asymmetric stress can be created by utilizing materials with different expansion coefficients, for example, a core can be is made of Ge-doped silica and while the moat can made of B-doped silica.

In addition, in order to create a single polarization fiber, the optical fiber needs to have a large amount of birefringence and a low index region, so as to create differential cut-off wavelengths between two polarization modes. The low index region(s) may be, for example, the moat 40 and/or the inner core region 32. This configuration would separate the two polarizations into two different wavelengths, due to large amount of birefringence.

Figure 11A:
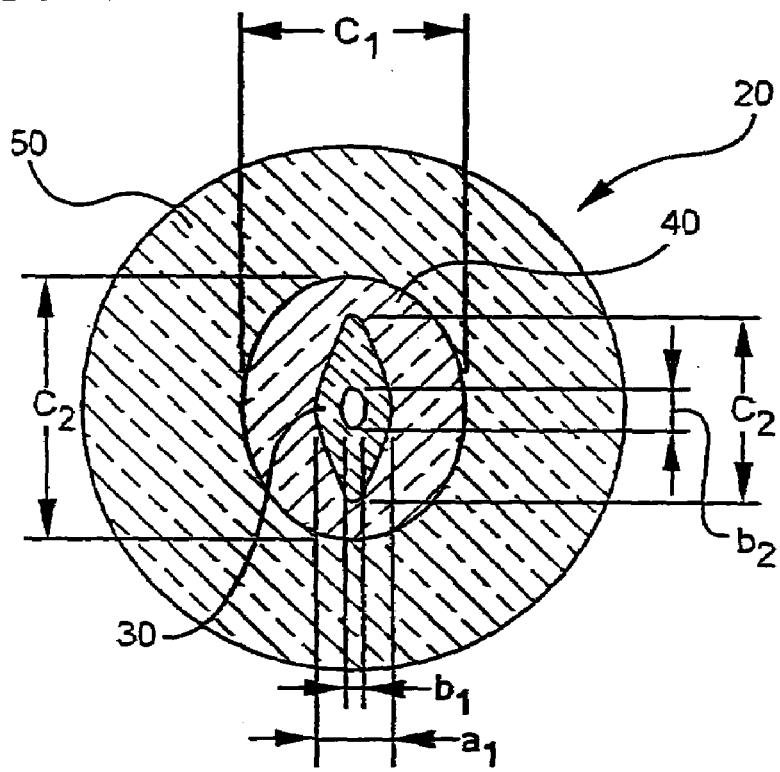
FIG. 11A-11D are cross-sectional views of a further embodiments of the optical fiber in accordance with the present invention.

Another embodiment of the fiber 20 is shown in cross-section in FIG. 11A. The fiber 20 includes a diamond-shaped central core 30 made of Ge doped Si, a slightly elongated moat 40 made of F doped Si, and a cladding region 50 surrounding the moat and made of pure Si. As with the other embodiments described herein, the fiber's polymer coating is not shown for clarity. The core 30 is doped such that the core delta, $\Delta_1\%$, is greater than 0.2%, the core includes, at its center, an air-filled hole 25, and the moat 40 is fluorine-doped sufficiently to provide a negative relative refractive index $\Delta_2\%$, which is preferably less than about −0.15%. Preferably, the absolute value of $\Delta_1\%$ plus the absolute value of $\Delta_2\%$ is greater then 0.4%.

In the FIG. 11A embodiment, the dimension, c, of the moat 40 is unequal to the dimension, a2, of the core 30. Contrary to the previously-described embodiment, the dimension, c2, is larger than the dimension, a2, i.e., the core 30 is not tangent to the moat 40 along the long dimension, a2. In particular, the c2/a2 ratio is greater than 1.0; preferably less than about 4.0, more preferably less than 3.5; and in some embodiments, less than 2.75 or even less than 1.8. Accordingly, it should be apparent that excellent single polarization properties for the fiber are provided when the following combination of ratios are provided: c2/a2 ratio less than 4.0, ratio of a2/a1 in the range of 1.5 and 5.0, and c1/a1 ratio in the range of between 2.0 and 7.0. The c2/c1 ratio for this embodiment may be 1.0 or more.

Figure 11B:
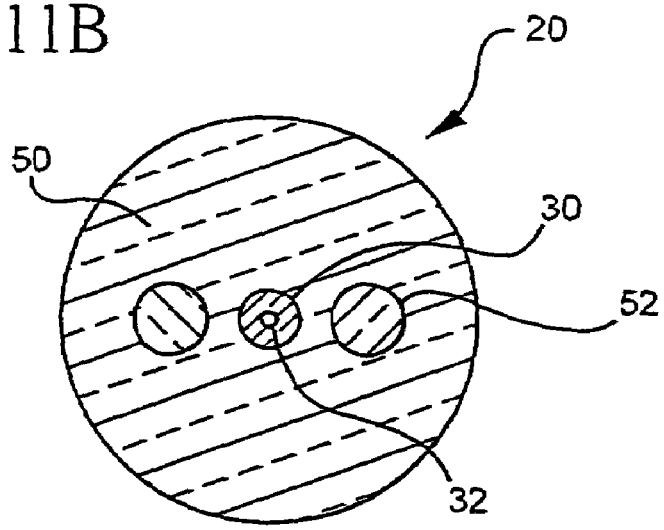
Figure 11C:
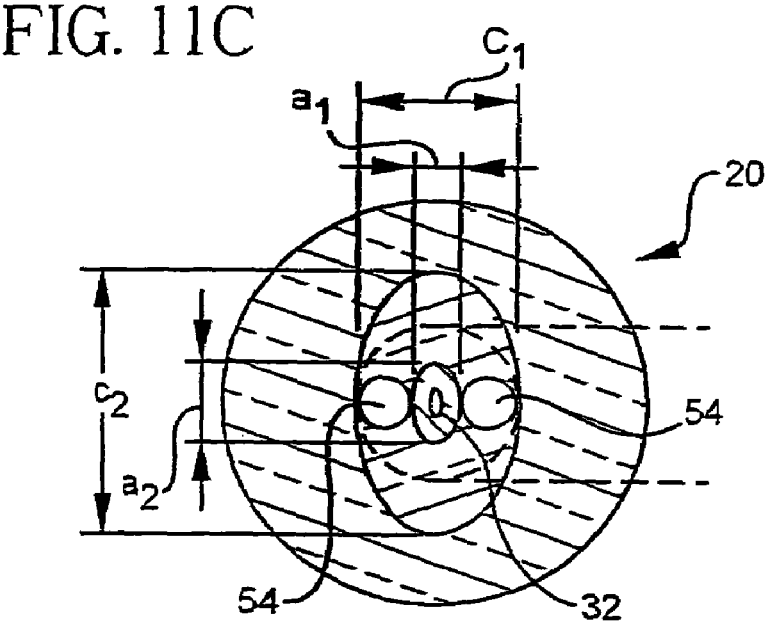
Figure 11D:
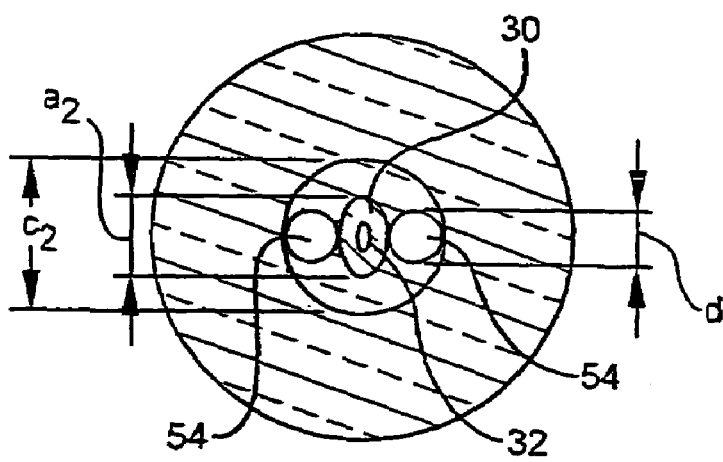

FIGS. 11B–11D illustrate three additional embodiments of the optical fiber 20 of the present invention. The optical fiber 20 illustrated in FIG. 11B includes a circular core 30 made of Ge doped silica and the elliptical inner core region 32 having an index of refraction lower than that of silica. The inner core region 32 may be an air hole, or for example F or B doped silica. Cladding 50 surrounds the core 30 and the stress birefringence members 52. The stress birefringence members 52 may be made, for example of Boron doped silica, or any glass material having thermal expansion coefficient TCE different from that of the cladding 50. Alternatively, the optical fiber 20 may utilize two or more air holes 54, instead of the stress birefringence members 52. It is also noted that the core 30 may be elongated, instead of circular. If the core 30 is elongated, the inner core region 32 may have either a circular, or an elongated cross-section.

The optical fiber 20 illustrated in FIGS. 11C and 11D utilize circular air holes 54 positioned on either side of the core 30. The holes 54 may be formed inside the moat 40, or as shown in FIG. 11D and partially inside the moat 40 and partially inside the cladding 50. Although only one hole 54 is shown on each side of the core 30, multiple holes along each side of the core 30 may also be utilized. The holes 54 are preferably circular, but may optionally be of other shapes and may be of equal or non-equal size and preferably have a maximum dimension or diameter of 1 μm to 15 μm, more preferably 3 μm to 10 μm.

The optical fibers 20 according to embodiments of the present invention each exhibit optical properties enabling ether polarization maintenance or single polarization propagation (transmission of one, and only one, polarization mode) within a designed SPB 60 (See FIG. 6, for example). Preferably, the SPB 60 of the fiber 20 according to the invention is designed to be located at a wavelength between about 800 and 1700 nm. Most preferably, the fiber's SPB 60 will be designed such that a centermost wavelength thereof will substantially coincide with the centermost wavelength of the operating wavelength band of interest. For example, the SPB 60 may be designed such that the 980, 1060, 1310 or 1550 nm wavelengths fall within it, such that it is readily useable with optical components and systems operating at the 980, 1060, 1310 or 1550 nm windows/bands. In particular, it is preferred that the fiber parameters be selected such that the center wavelength of the SPB 60 substantially coincides (within about +/−20 nm) with the center wavelength of the operating wavelength of interest.

The preferred structure described herein for the fibers 20 in accordance with the invention produces optical measurements as described below. In particular, the single polarization fiber 20 preferably exhibits a SPB 60 of at least 10 nm in band width, more preferably greater than 20 nm in width; more preferably yet greater than 25 nm; and most preferably greater than 50 nm (all measured on a 1 m length). Furthermore, the fiber 20 preferably exhibits attenuation at the center wavelength of the SPB 60 of less than 25 dB/km; more preferably less than 5 dB/km. Each of the fibers described below include physical structures similar to that shown in FIGS. 3C and 11A–D, but instead of having step index shapes on the core, include gradient index shapes as illustrated by dotted line 31, with alpha being about 2.

The relative refractive index parameters Δ2%, Δ3% and the core and moat dimensions a1, a2, c1, and c2 (adjusting the Davg, a1/a2 ratio, c2/a2 ratio and c1/a1 ratio) may be adjusted to cause a resultant change in the birefringence, cut-off wavelengths, $\lambda_1$, $\lambda_2$ t, of the two polarizations, as well as the width of the SPB. Accordingly, it should be recognized that the SPB for the fiber 20 may be readily adjusted thereby allowing use in a multitude of systems and devices which operate at different operating bands. In particular, the optical fiber's parameters may be selected and designed such that the SPB may be designed to substantially coincide with the operating wavelength band of interest for the system or device.

Table 3, provides data for three optical fibers. The first optical fiber does not include the inner core region 32 as described above. The second optical fiber includes a F-doped inner core region 32. The third optical fiber includes an air hole as its inner core region 32. This table illustrates that the mode field diameter MFD (which corresponds to the guiding area of the fiber) increased significantly when the optical fiber includes the inner core region 32, and the two optical fibers with the depressed index inner core region 32 have the large MFD diameters corresponding to the larger optical signal guiding area (including the area of the inner core region 32). It is preferable that the guiding area of the optical fiber be larger than 13 μm². It is preferable that the optical fibers according to the present invention have large MFD diameters corresponding to a guiding area (including the area of the inner core region 32) of over 14 μm² and preferably between 15 μm² and 45 μm², more preferably between 16 μm² and 35 μm²). It is preferable that the mode field area (MF area) of the optical fiber be larger than 20 μm², preferably between 30 μm² and 75 μm² and more preferably between 30 μm² and 60 μm². Table 3 illustrates that the guiding area of the optical fibers having inner core region 32 (examples 2, and 3 of Table 3) has been increased by 53% and 172%, respectively when compared to the optical fiber without inner core region 32 (example 1 of Table 3).

TABLE 3

|  | Example 1 | Example 2 | Example 3 |
|---|---|---|---|
| $B_1$ (μm) | 0. | 1 | 1 |
| $B_2$ (μm) | 0. | 0.6 | 0.6 |
| $A_1$ (μm) | 2.5 | 3.25 | 4.25 |
| $A_2$ (μm) | 1.5 | 1.95 | 2.55 |
| $C_1$ (μm) | 7.5 | 7.5 | 7.5 |
| $C_2$ (μm) | 4.5 | 4.5 | 4.5 |
| $\Delta_0$ (%) | NA | −0.5 | −54 |
| $\Delta_1$ (%) | 1 | 1 | 1 |
| Birefringence* | $3.7 \times 10^{-5}$ | $3.6 \times 10^{-5}$ | $5 \times 10^{-5}$ |
| Guiding Area (μm²), including the inner core region | 11.8 | 18.0 | 32.1 |
| MFD* (minor axis, (μm)) | 4.2 | 6.2 | 7.4 |
| MFD* (major axis, (μm)) | 5.3 | 7.5 | 9.7 |
| MF Area | 17.5 | 36.5 | 56.3 |

*Measured at 1300 nm.

It is noted that the optical fibers of Table 3 did not include the moat 40. The addition of the moat 40 would make the optical fibers operate as SP fibers. It would be preferred that the largest dimension of the moat be about 1.5–4 times the largest core dimension. The addition of the moat 40 lowers the effective indices of both polarization modes. The refractive index of the moat is preferably chosen such that the effective index of one polarization mode be below that of the cladding 50. For example, the moat 40 added to the optical fibers of Examples 2 and 3 of Table 3 may have indices that are respectively 4.647% and 4.623% lower than that of the cladding 50.

Figure 12:
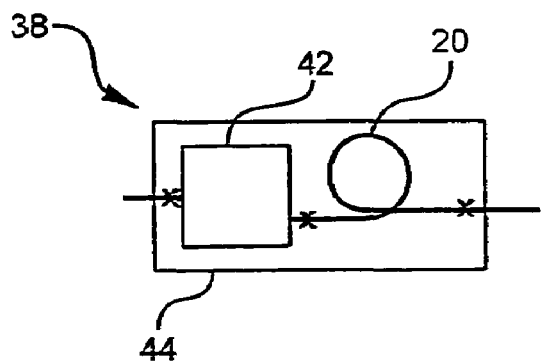
FIG. 12-14 are block diagrams of various systems or apparatus including the optical fiber in accordance with the present invention.

FIG. 12 illustrates one apparatus 38 employing the single polarization fiber 20 according to the embodiments described herein. The system apparatus 38 includes an optical device 42, such as a laser, gyroscope, sensor, modulator, beam splitter, polarization multiplexer, or the like having the fiber 20 in accordance with the invention included therein or otherwise attached or optically coupled thereto. The fiber 20 and the optical component 42 may be included in a housing 44 and comprise subcomponents in the apparatus 38.

Figure 13:
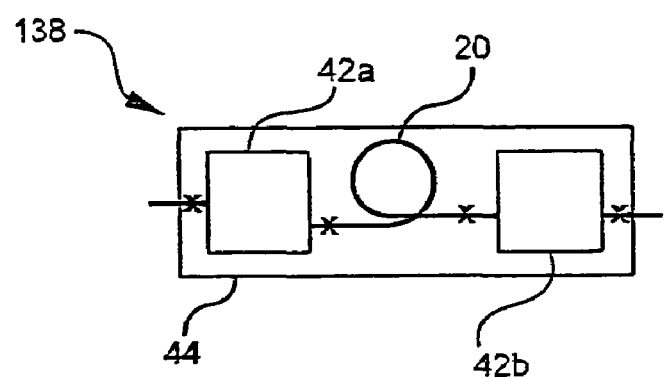

Shown in FIG. 13 is another apparatus 138 wherein the fiber 20 in accordance with embodiments of the invention is attached between optical components 42a, 42b and wherein the fiber 20 and the optical components are optionally contained within a housing 44.

Figure 14:
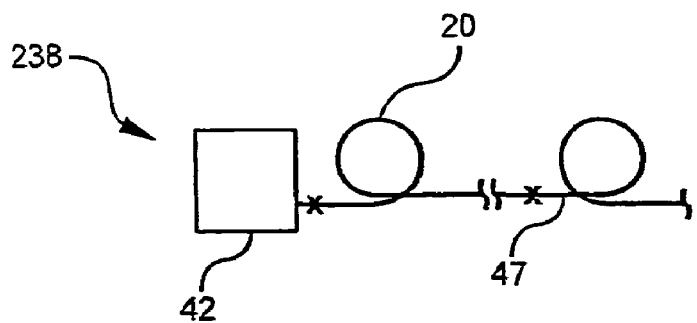

Similarly, FIG. 14 illustrates a system apparatus 238 wherein the fiber 20 in accordance with embodiments of the invention is attached to an optical component 42 and wherein the fiber is also optically coupled to another type of fiber 47. The x's shown in FIGS. 12–14 designate splices, connectors, or other like optical connections.

Fibers 20 described herein can be formed, for example, by utilizing the following method of manufacturing. First the core is manufactured, for example, by a standard OVD process. In order to make a core with an air hole inner core region we start with a bait rod that can be either circular, or have an elongated cross-section. The core materials are deposited onto the bait rod during the laydown step. After the laydown step, the rod is removed from the center of the soot core blank, which leaves an air hole inside the soot core blank. The soot core blank is then consolidated (densified into the solid glass) to become the core preform, with positive air pressure applied to the center, in order to keep the hole open. Preferably, the air pressure range is greater than atmospheric pressure, to balance the consolidation forces. Preferably the air pressure is in less than 2 PSI, and more preferably, less than 1 PSI. Alternatively, when making a core with the down-doped glass center region, a down-doped glass rod is utilized as a starting bait rod. The rod stays inside the OVD blank during consolidation step to become the down-doped inner core region. The core preform is then drawn into smaller diameter rods-shaped canes 52, as illustrated in FIG. 15.

The cane 52 includes portions 125, 130, 140 which correspond to the innermost core region with the low refractive index (for example, air hole), the core 30 and the moat 40 and which have the proper germania and fluorine doping and a core/moat ratio of about 0.45. The core cane 52 was preferably 1 meter long and about 13–15 mm in diameter and was manufactured by a conventional OVD method. Grooves 54 are then ground into the diametrically opposite longitudinal sides of the cane 52 to a width of about 3.4 mm and to a depth of about 4.0 mm, as illustrated in FIG. 16, thereby forming grooved cane 52a. The grooved rod 52a was then HF (hidrofloride acid) etched for about 30 minutes to simply clean any grinding residue. The grooved cane 52a is sealed on top and is still open at the bottom. (This allows the vacuum in the subsequent step to be applied to the side holes and not to the cent hole, so as to enable maintenance of the center air-filled hole in the core. The grooved cane 52a with the sealed top is then inserted into a 1 meter long silica tube 56 overclad with silica soot 58, as shown in FIG. 17, to form a preform subassembly 60. Silica overcladding 58 is preferably produced by an Outside Vapor Deposition (OVD) method on the sleeve 56, for example.

Figure 19:
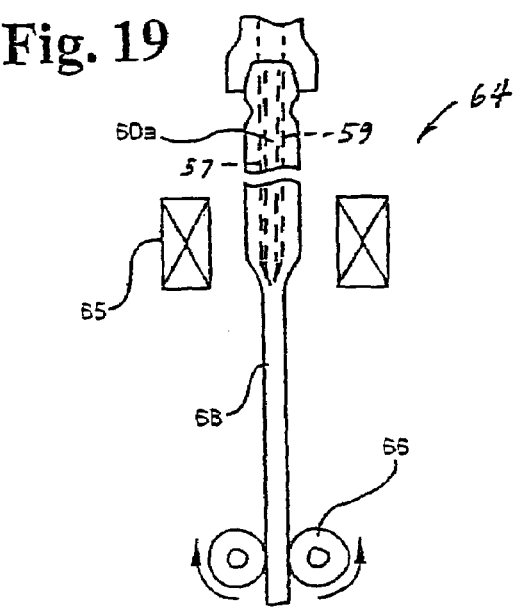

The perform subassembly 60 of FIG. 17 is then consolidated in accordance with a conventional consolidation process as shown in FIG. 18 by first drying in a consolidation furnace 62 in an atmosphere of $Cl_2$, and then consolidating in the furnace in a He-containing atmosphere to vitrify the glass and produce a fully consolidated perform 60$a$. The holes 57, 59 in the consolidated perform are then etched in HF to remove additional material. Alternatively, $NF_3$ could be used as an etchant. The consolidated perform 60$a$ is then inserted into a redraw tower 64, as shown in FIG. 19. Heat is applied to consolidated perform 60$a$ by heating element 65 and it is drawn down by tension applying wheels 66 into an approximately 8 mm diameter core cane 68. While the redraw process (drawing to a smaller diameter core cane from the perform 60$a$) is occurring, a vacuum is applied to the side holes 57, 59 sufficient to completely close them during redraw, while maintaining positive air pressure inside the core, if air-filled inner core region is desired. During side hole closure and the redraw step, the portion corresponding to the core 30 elongates laterally and produces the general elongated core configuration as described herein.

Figure 20:
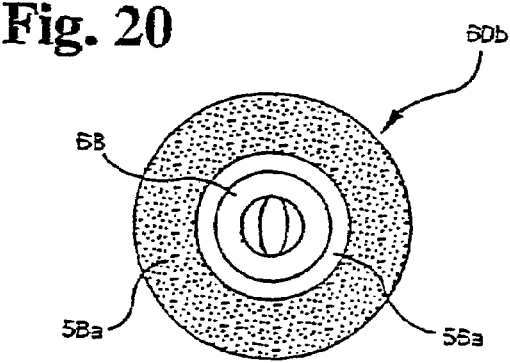
Figure 21:
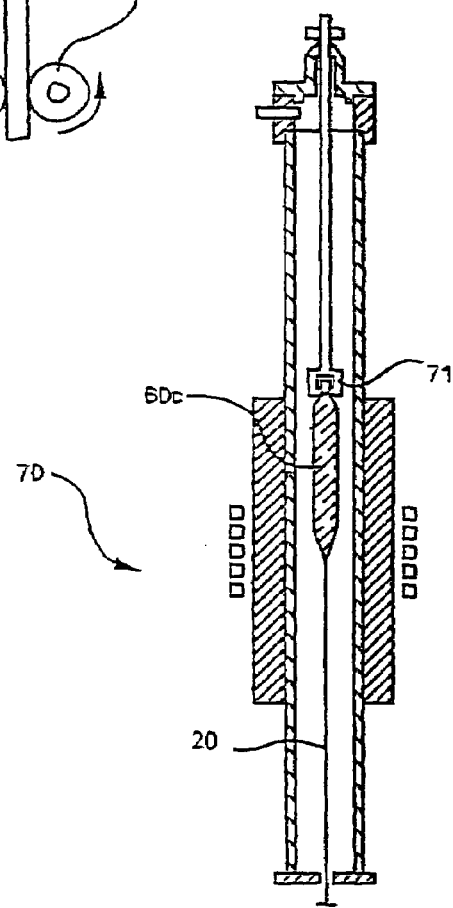

This cane 68, now having an elongated central core, is again inserted into a 1 meter long silica tube 56$a$ overclad with silica soot 58$a$, as shown in FIG. 20, to form a perform subassembly 60$b$ having the desired core/clad ratio. This perform subassembly 60$b$ is again consolidated in the same manner as heretofore described with respect to FIG. 18. The fully consolidated blank 60$c$ produced therefrom is then suspended from a handle 71 within a draw furnace 70, as shown in FIG. 21, and the fiber 20 in accordance with aspects of the invention is drawn using either conventional draw methods (when producing an optical fiber with a down-doped inner core region) or modified draw methods (i.e., while maintaining positive air pressure inside the core (when producing a core with an air-filled innermost region). It is noted that in order to make an optical fibers shown in FIGS. 11B–11D, the rods-shaped canes 52 are processed in a manner described in U.S. patent application Ser. No. 10/864,732 entitled single Polarization Optical Fiber and System and Method for Producing Same, filed Jul. 18, 2003 and incorporated by reference herein.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. An optical fiber, comprising:
    a core with a first refractive index ($n_1$) and the innermost core region with the refractive index $n_0$, wherein $n_0<n_1$, and at least one of said core and said innermost core region has an elongated cross-section;
    a cladding surrounding the core, the cladding having a third refractive index ($n_3$),
    wherein $n_1>n_3$; and
    the optical fiber exhibits polarization maintenance in at least one of X—X or Y—Y axis.

2. The optical fiber according to claim 1 wherein said inner most core region is an air filled hole.

3. The optical fiber according to claim 1 wherein said inner most core region is silica down-doped with at least one dopant selected from the group consisting essentially of: boron and fluorine.

4. The optical fiber according to claim 1 wherein said fiber exhibits single polarization in a single polarization band.

5. The optical fiber according to claim 1 further comprising a moat surrounding and abutting the core and situated between the core and the cladding, the moat having a second refractive index ($n_2$), wherein $n_1>n_2$ and $n_3>n_2$.

6. The optical fiber according to claim 5 wherein said fiber exhibits single polarization in a single polarization band.

7. The optical fiber of claim 1 wherein said fiber exhibits single polarization within a single polarization band with the bandwidth is at least 25 nm.

8. The optical fiber of claim 1 wherein said fiber exhibits single polarization within a single polarization band with the bandwidth is at least 40 nm.

9. The optical fiber of claim 1 wherein said fiber exhibits single polarization within a single polarization band with the bandwidth is at least 80 nm.

10. The optical fiber of claim 7 wherein said single polarization band is centered around one of the following wavelengths: 1060 nm, 131 nm, 1550 nm.

11. The optical fiber of claim 1 wherein the core contains germania-doped silica and the moat contains silica doped with at least one of fluorine and or boron.

12. The optical fiber of claim 1 further comprising a maximum relative refractive index ($\Delta 2$) of the core of greater than 0.2%.

13. The optical fiber of claim 1 further comprising a maximum relative refractive index ($\Delta 2$) of the core of between 0.5% and 2.5%.

14. The optical fiber of claim 1 further comprising a relative refractive index ($\Delta 3$) of the moat of more negative than −0.15%.

15. The optical fiber of claim 1 further comprising a relative refractive index ($\Delta 3$) of the moat between −0.15% and −0.8%.

16. The optical fiber of claim 1 further comprising a short core dimension between 2 to 5 microns and a long core dimension between 5 and 20 microns.

17. The optical fiber of claim 1 wherein a ratio of c2/c1 is less than 1.8.

18. The optical fiber of claim 1 wherein the ratio of b2/b1 is between 1.5 and 3.5.

19. The optical fiber of claim 1 wherein the fiber guiding area is larger than 15 $\mu m_2$.

20. The optical fiber of claim 1 wherein the fiber guiding area ($\mu m_2$) of said optical fiber is between 16 $\mu m_2$ and 35 $\mu m_2$.

21. An apparatus including the optical fiber of claim 1.

22. An optical fiber, comprising:
    a core including a first refractive index ($n_1$), said core having a first dimension (a1) and a second dimension (a2), said core including a centermost inner core region with the refractive index $n_0$, wherein $n_0<n_1$, and said inner core region having outer dimensions (b1) and (b2), such that (b1) is along the X—X axis and (b2) is along Y—Y axis, wherein the axis X—X is generally orthogonal with the axis Y—Y;
    a moat surrounding abutting said core, said moat having a second refractive index ($n_2$) and, an outer dimension (c2) along an axis X—X aligned with the second dimension (a2), and an outer dimension (c1) along an axis Y—Y aligned with the first dimension (a1); and a cladding surrounding the moat, the cladding having a third refractive index ($n_3$), wherein
  at least one of said core, inner core region or moat is laterally elongated such that the ratio of at least one of a2/a1; b2/b1, c2/c1 is not 1:1,
$n_1 > n_3 > n_2$,
a ratio of a2/a1 is between 1.0 and 4.0,
a ratio of c1/a1 is between 1.0 and 5.0, and
the optical fiber exhibits single polarization in a single polarization band.

23. The optical fiber according to claim 22, wherein said core is laterally elongated.

24. The optical fiber according to claim 22, wherein said moat is laterally elongated.

25. The optical fiber according to claim 22, wherein said inner core region is laterally elongated, such that b2/b1≠1.

26. The optical fiber of claim 7 further comprising
  a ratio of c2/a2 less than 2.75, and
  a ratio of c1/a1 less than 3.

* * * * *

UNITED STATES PATENT AND TRADEMARK OFFICE
CERTIFICATE OF CORRECTION

PATENT NO.       : 7,158,705 B2
APPLICATION NO.  : 10/930889
DATED            : January 2, 2007
INVENTOR(S)      : George Edward Berkey et al.

It is certified that error appears in the above-identified patent and that said Letters Patent is hereby corrected as shown below:

Col 16, line 24,   wavelengths: 1060 nm, 131 nm, 1550 nm should be wavelengths: 1060 nm, 1310 nm, 1550 nm.

Col. 16, line 48,  area is larger than 15 $\mu m_2$ should be area is larger than $15 \mu m^2$ Col. 16, line 50,  area ($\mu m_2$) of said optical fiber is between 16 $\mu m_2$ and 35 should be area ($\mu m^2$) of said optical fiber is between 16 $\mu m^2$ and 35

Col. 16, line 51,  $\mu m_2$ should be $\mu m^2$

Col. 18, line 9,   aratioofc1/a1 less than 3 should be a ratio of c1/a1 less than 3.

Signed and Sealed this

Seventeenth Day of April, 2007

JON W. DUDAS
*Director of the United States Patent and Trademark Office*